US008511908B2

(12) United States Patent  
Cairns et al.

(10) Patent No.: US 8,511,908 B2  
(45) Date of Patent: *Aug. 20, 2013

(54) WET MATE CONNECTOR

(75) Inventors: James L. Cairns, Ormond Beach, FL (US); Srikanth Ramasubramanian, Ormond Beach, FL (US); Stewart M. Barlow, Worthing (GB)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,308

(22) Filed: Jun. 4, 2012

(65) Prior Publication Data

US 2012/0294569 A1 Nov. 22, 2012

Related U.S. Application Data

(63) Continuation of application No. 12/212,870, filed on Sep. 18, 2008, now Pat. No. 8,192,089.

(60) Provisional application No. 60/974,757, filed on Sep. 24, 2007.

(51) Int. Cl.
*G02B 6/36* (2006.01)

(52) U.S. Cl.
USPC .......... 385/53; 385/55; 385/56; 385/70; 385/75; 385/138; 385/139; 439/131; 439/141; 439/197; 439/201

(58) Field of Classification Search
USPC ............ 385/53, 55, 56, 70, 75, 138, 139; 439/131, 141, 197, 201

See application file for complete search history.

(56) References Cited

U.S. PATENT DOCUMENTS 6,315,461 B1 * 11/2001 Cairns .................. 385/56
6,736,545 B2 * 5/2004 Cairns et al. ............. 385/56

* cited by examiner

*Primary Examiner* — Uyen Chau N Le
*Assistant Examiner* — Chad Smith
(74) *Attorney, Agent, or Firm* — Procopio Cory Hargreaves & Savitch LLP

(57) ABSTRACT

A connector has first and second connector units, each unit incorporating an oil-filled chamber housing one or more contact elements to be joined. At least one connector unit has a face seal assembly which seals the forward end of the contact chamber in the unmated condition. The face seal assembly comprises three elements. One element is an annular elastomeric seal situated radially outward. The two other elements are inner seal elements which are pressed together radially to form a substantially disc-like shape. The resulting disc-like shaped seal fills the central, circular end face opening of the outer annular seal. As the connector units are mated, elements of the elastomeric face seal assembly are displaced, one axially, and others both axially and radially, creating an opening between the oil-filled chambers that is sealed from the outside environment.

34 Claims, 12 Drawing Sheets

WET MATE CONNECTOR

RELATED APPLICATION

The present application is a Continuation of co-pending U.S. patent application Ser. No. 12/212,870 filed on Sep. 18, 2008, which issued as U.S. Pat. No. 8,192,089 on Jun. 5, 2012, and which claims the benefit of U.S. provisional patent application No. 60/974,757, filed Sep. 24, 2007, and the contents of each of the aforementioned applications are incorporated herein by reference in their entirety.

BACKGROUND

1. Field of the Invention

The present invention relates generally to connectors which can be mated and unmated in a harsh environment, such as underwater.

2. Related Art

There are many types of connectors for making electrical and fiber-optic cable connections in hostile or harsh environments, such as undersea connectors which can be repeatedly mated and demated underwater at great ocean depths. These connectors typically consist of plug and receptacle units or connector parts, each attached to cables or other devices intended to be joined by the connectors to form completed circuits. To completely isolate the contacts to be joined from the ambient environment, one or both halves of these connectors house the contacts in oil-filled, pressure-balanced chambers.

Both the plug and receptacle halves of most fiber-optical connectors which are mateable in a harsh environment have oil-filled chambers. The chambers are typically brought face-to-face during an early step of the mating sequence. In a subsequent mating step, one or more connective passages, sealed from the outside environment, are created between the chambers of the mating connector halves. The passages join the two oil-filled chambers, creating a single, connected oil volume. Actual connection of the contact junctions then takes place within the common oil chamber. There are several patented examples of such connectors, such as U.S. Pat. Nos. 4,682,848; 5,738,535; 5,838,857; 6,315,461, and 6,736,545.

Some such existing connectors work very well. The technology is relatively new, however, and there is still much room for improvement. In particular, the existing products are complex, expensive, and their reliability is not flawless.

Therefore, what is needed is a system and method that offers improvements in complexity, performance, and reliability and reduces or overcomes these significant problems found in prior wet mate connectors as described above.

SUMMARY

Embodiments described herein provide a new wet mate or harsh environment connector.

In one embodiment, a connector has first and second connector units or plug and receptacle units, each unit incorporating an oil- or other fluid-filled contact chamber housing one or more contact elements to be joined. Each oil chamber is pressure balanced to the outside environment by way of flexible elements that adjust the chamber's size to compensate for volumetric changes of its contents. When the connector units are mated, axially opposed elastomeric face seal assemblies of the units are pressed together, completely sealing the plug-receptacle interface from the outside environment. As the mating sequence proceeds, elements of the elastomeric face seal assemblies are displaced, some axially, and others both axially and radially, creating an opening between the oil-filled chambers that is sealed from the outside environment.

In one embodiment, the face seal assemblies of both connector units comprise three elements. One element is an outer annular elastomeric seal situated radially outward. The two other elements, viewed from the mating faces of the connectors, appear as a diametrically split elastomeric disc, or two elastomeric disc halves of substantially half-circular shape that are pressed together radially to form a full-circular shape. The resulting inner seal fills the central, circular opening at the forward end of the outer annular seal. Thus, the completed sealing face of each unmated connector half comprises the three elements radially squeezed together to form a single unit that completely encloses its mating face.

As the connector halves are mated, their opposing elastomeric faces press against each other axially, sealing the entire plug-receptacle interface from the outside environment. The next step in the mating sequence finds the pressed-together, split, disc-shaped inner seals displaced axially inwardly into the receptacle, away from the annular outer seals. As the split seals move inwardly, they enter a larger diameter bore within the receptacle that allows their separate half-circular discs to spring radially outward, away from each other, thus creating an open path between the inner faces of the half-circular discs oriented along the axial centerline of the mated connector units. The action effectively creates an open passageway between the two oil chambers when the plug and receptacle halves are mated. The interface between the plug and receptacle units remains sealed from the outside environment by the pressed-together annular outer seals.

In a subsequent step of the mating sequence, one or more contact probes from one of the connector units effectively pass through the open passageway and into the other connector unit, where they join with one or more respective contacts to create one or more completed circuits within the common, pressure-balanced oil bath.

The connector de-mating sequence is just the reverse of the mating sequence. When de-mating, the one or more contact probes disconnect from the respective one or more contacts in the other connector unit, moving axially away from them, and withdrawing back through the annular outer seal and into the body of the respective connector unit. The half-circular disc-shaped seal elements then move together radially to form full-circular discs, and move axially to fill the central openings of their respective annular outer seals. That action effectively seals the individual plug and receptacle end faces, while the plug-receptacle interface between the connector units still remains sealed from the outside environment by the still pressed-together annular outer seals. Next, the plug and receptacle units separate, removing the spring forces that pressed the annular outer seals together, and the two individually-sealed connector units are disconnected.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
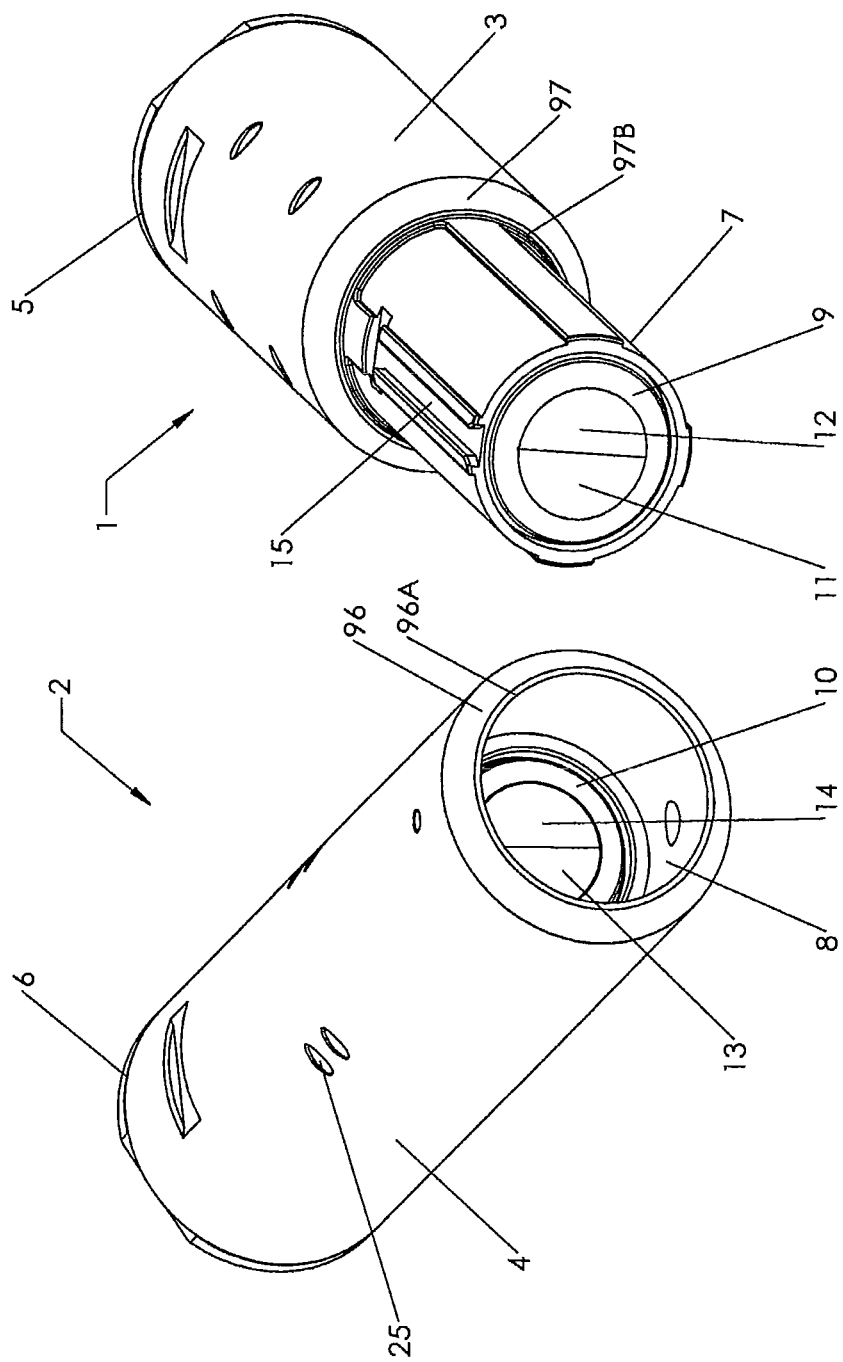
FIG. 1A is a perspective view of a first connector unit or plug unit of one embodiment of a connector, shown in the unmated condition.
FIG. 1B is a perspective view of a second connector unit or receptacle unit for releasable mating engagement with the plug unit of FIG. 1A, with the receptacle unit shown in the unmated condition.

Certain embodiments as disclosed herein provide for a wet mate or harsh environment connector which may be mated and unmated in a wet environment or underwater, or in other harsh conditions, and has contact chambers which are sealed both in the mated and unmated conditions. Although the disclosed embodiments are concerned with a fiber-optical connector, the optical junctions may be replaced by electrical junctions to form an electrical connector, or by electro-optical junctions to form a hybrid electro-optical connector in alternative embodiments. Although the connector is described as a wet mate connector, the language "wet mate" should be interpreted to include connectors used in all kinds of harsh conditions.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

FIGS. 1 to 12 illustrate an optical connector comprising releasably mateable first and second connector units or plug and receptacle units 2, 1. FIGS. 1A and 1B illustrate the first connector or plug unit 2 and the second connector or receptacle unit 1, respectively, in an unmated or disconnected condition. Each connector unit has an outer rigid shell 4, 3, with terminal nut 6, 5, respectively. A sealed chamber 60, 58 in the receptacle unit 1 (see FIG. 8) encloses contacts of a receptacle contact assembly 56 illustrated in FIG. 7, while a sealed chamber 22 in the plug unit 2 (see FIG. 2) encloses contacts of a plug contact assembly 24 illustrated in FIG. 6. Openings at the outer or forward ends of the respective contact chambers are sealed by face seal assemblies, and the outer or exposed ends of the face seal assemblies are visible in FIGS. 1A and 1B. The plug face seal assembly comprises a first or plug outer annular seal 10 (see FIG. 5) and a first or plug inner seal comprising seal elements 13 and 14 (illustrated in more detail in FIGS. 3 and 4). The receptacle face seal assembly comprises a second or receptacle outer annular seal 9 (see FIGS. 11A and 11B), and a second inner seal comprising receptacle seal elements 11 and 12 (illustrated in more detail in FIGS. 9 and 10).

Figure 3:
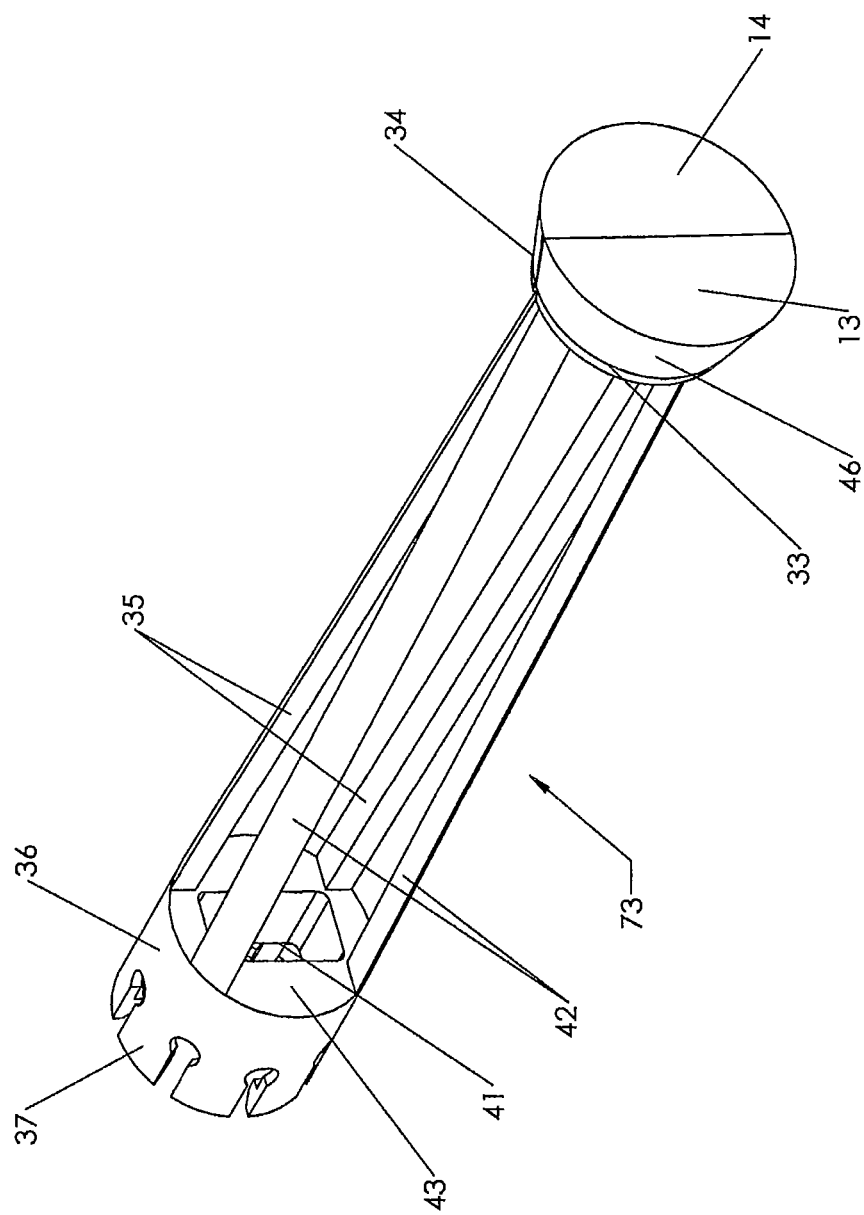
FIG. 3 is a perspective view of the plug inner seal assembly in the unmated condition.
Figure 4:
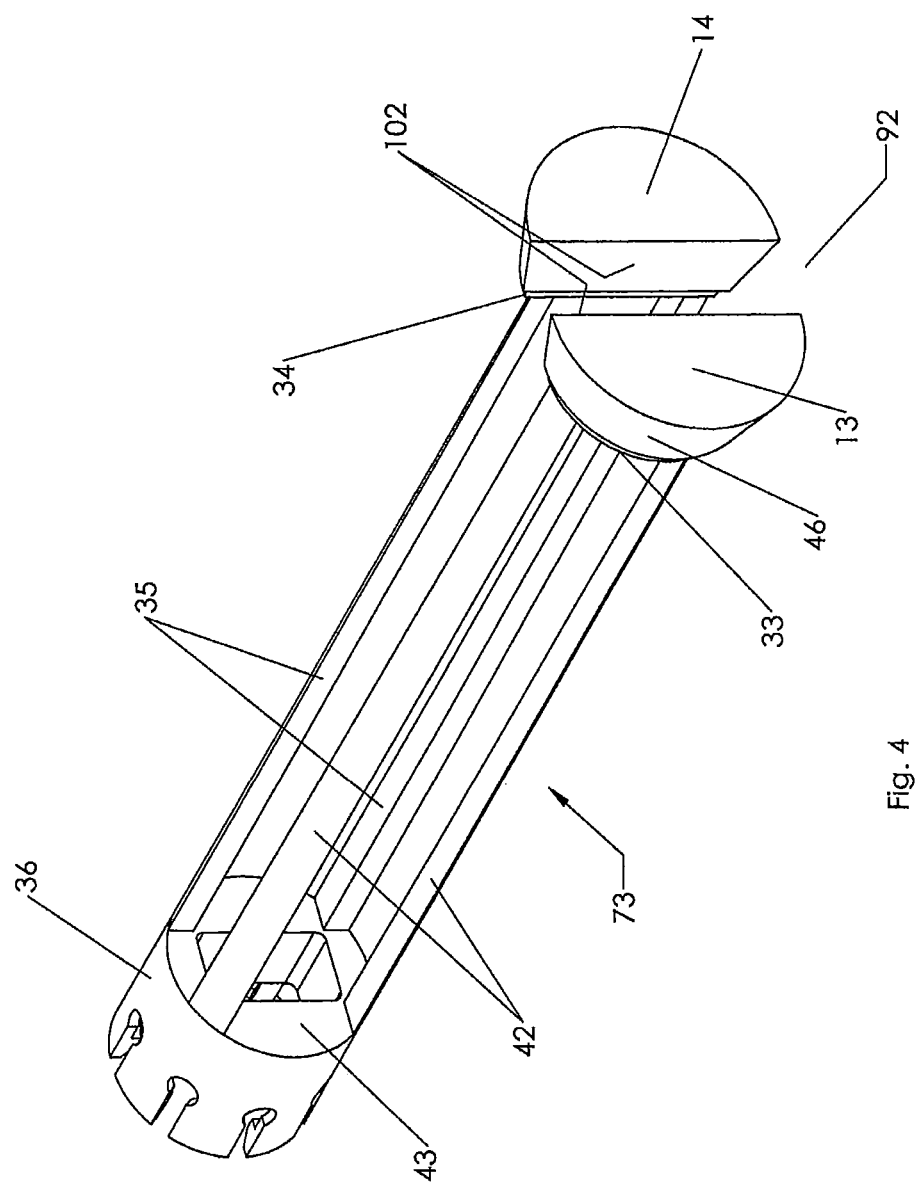
FIG. 4 is a perspective view of the plug inner seal assembly in the mated condition.

When the plug and receptacle or connector units 2, 1 are unmated as in FIGS. 1A, 1B, 2 and 8, the inner seal elements are positioned inside the respective outer annular seals which urge them into a sealed, closed condition, as described in more detail below in connection with FIGS. 2 to 12. When the plug and receptacle units are moved into mating engagement, smaller diameter portion 7 of receptacle shell 3 enters bore 8 of plug shell 4. As mating proceeds, receptacle outer annular seal 9 presses sealably against plug outer annular seal 10, and receptacle seal elements 11, 12 (FIGS. 9 and 10) press against plug seal elements 13 and 14 (FIGS. 3 and 4). Keyway 15 in receptacle shell 3 cooperates with an inwardly projecting key 20 (shown in FIG. 2) in plug shell 4 during mating to maintain rotational alignment of the mating connector halves.

Figure 2:
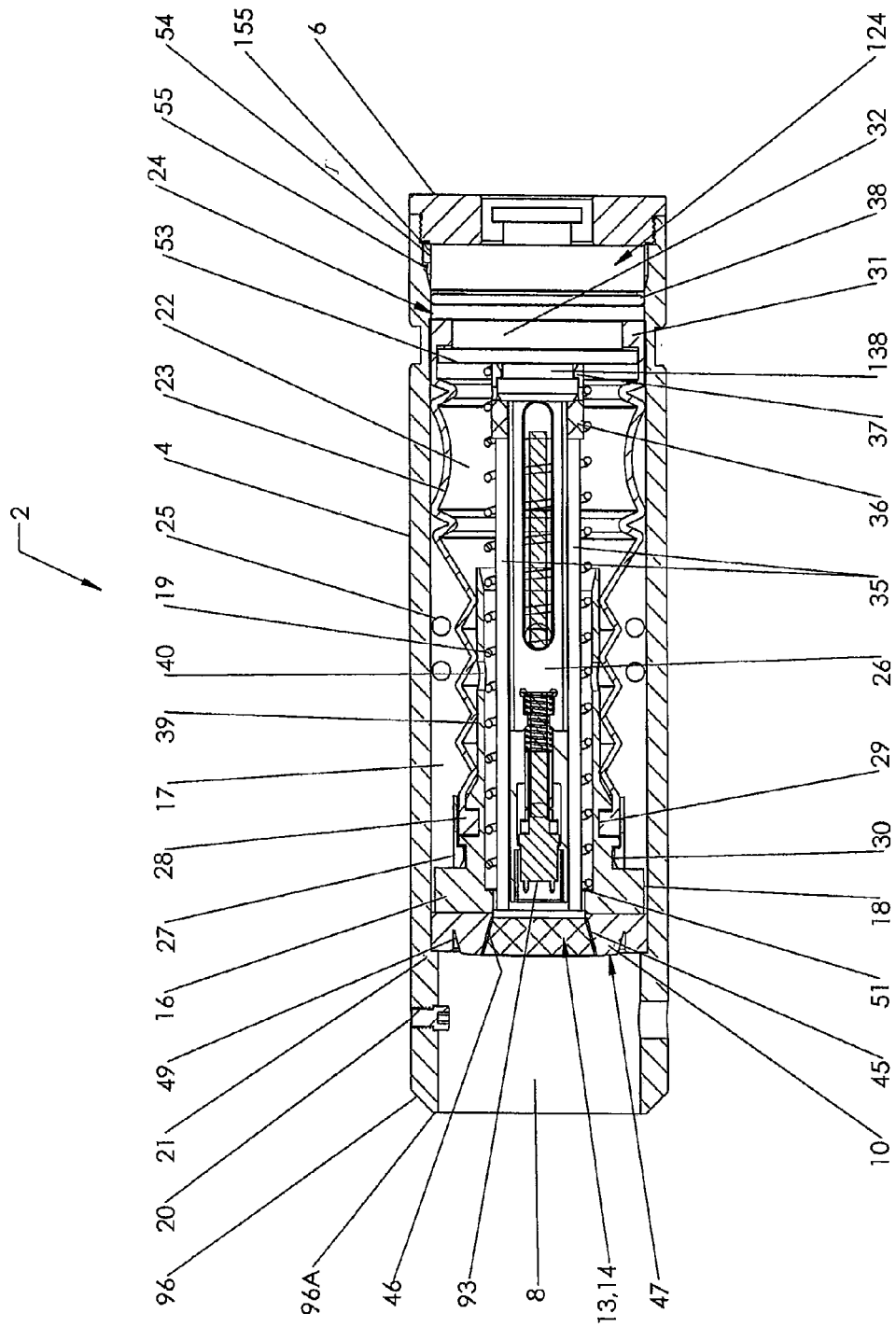
FIG. 2 is a partial axial cross-section of the unmated plug unit of FIG. 1A.
Figure 8:
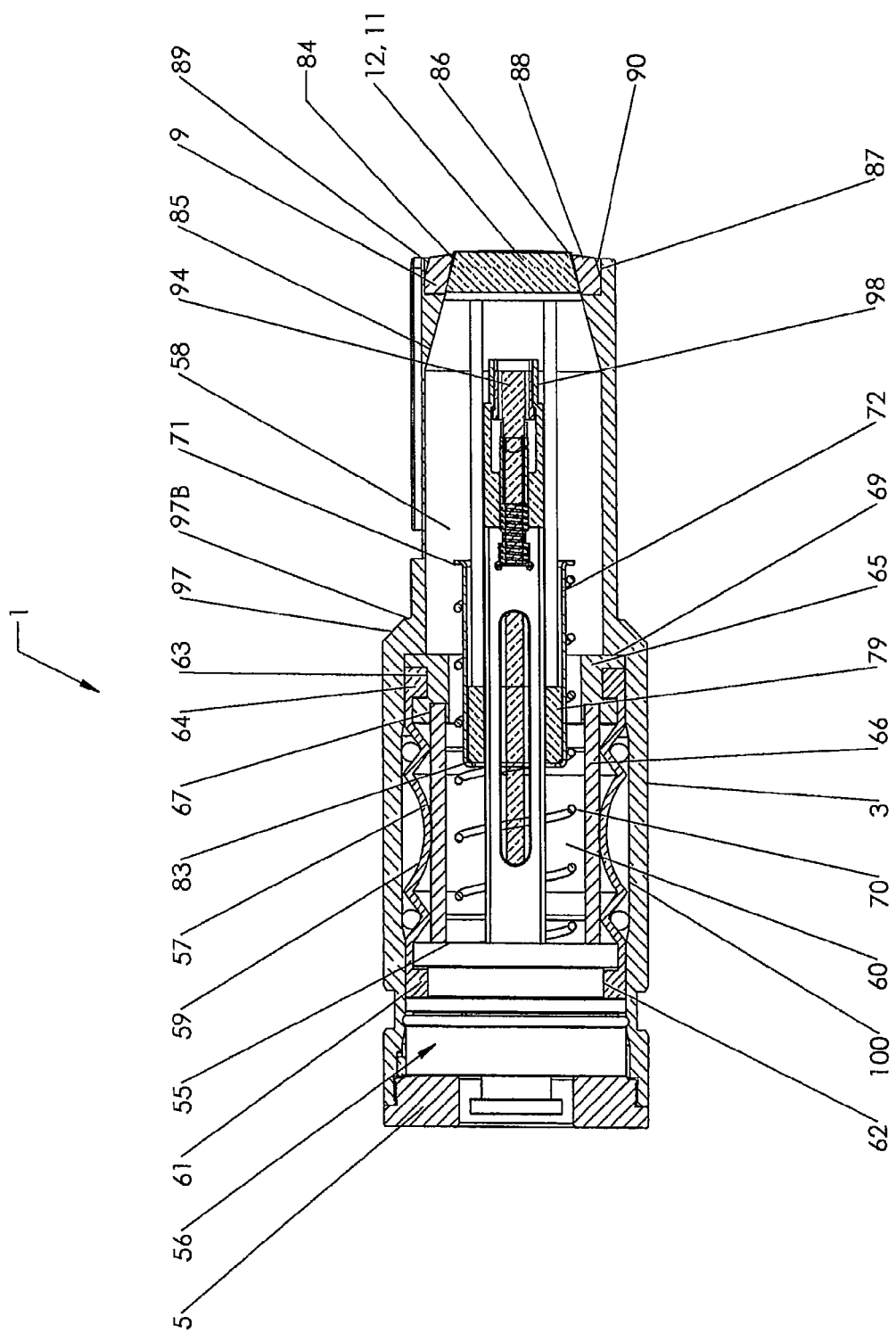
FIG. 8 is a partial axial cross-sectional view of the unmated receptacle unit of FIG. 1B.
Figure 9:
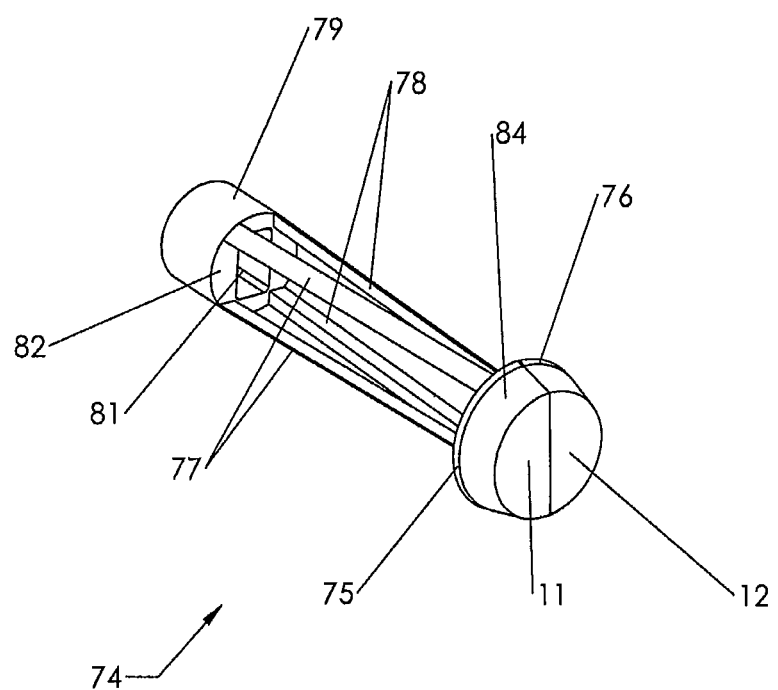
FIG. 9 is a perspective view of the unmated receptacle inner seal assembly.

Each outer annular seal 10, 9 has a tapered inner diameter or through bore 45, 86, respectively, as illustrated in FIGS. 2, 8, and 11. Each seal element has a tapered outer diameter designed for sealed mating engagement with the tapered inner diameter or through bore of the respective outer seal in the unmated condition of the plug and receptacle units. As illustrated in FIGS. 2 and 3, the seal elements 13, 14 of the plug unit in the unmated condition have an outwardly tapered outer diameter 46 extending up to their front end faces. The seal elements of the receptacle unit have an inwardly tapered outer diameter 84 extending up to their front end faces, as illustrated in FIGS. 8 and 9. The co-operation of the various parts of the seal assembly and the respective plug and receptacle shells as the units are moved into the unmated condition is described in more detail below, in connection with FIGS. 2, 3, 9, 10, and 12. Each seal element has a half-disc like shape with a flat diametrical face or seal face for sealing engagement with an opposing flat diametrical face of the other seal element of the respective pair, as described in more detail below in connection with FIGS. 3, 4, 9, and 10.

An axial cross-sectional view of unmated plug unit 2 is illustrated in FIG. 2. Outer annular seal 10 forms part of an annular end seal assembly 44 illustrated in more detail in FIG. 5 and described in detail below. Outer annular seal 10 is bonded or otherwise suitably attached to seal-support 16, and seal-support 16 and annular seal 10 are movably mounted in bore 17 of the plug shell. Outer annular seal 10 has a tapered inner diameter or through bore 45, as noted above. Seal-support 16 is generally circular in cross section and has an enlarged end portion 18 and a reduced diameter tubular portion 39 extending rearwards from the end portion 18. Seal-support 16 serves a number of functions. Larger diameter portion 18 rides loosely in bore 17 of plug shell 4 in which it is free to move rearward against spring 19. Spring 19 seats against shoulder 51 of seal-support 16 on its forward end and against face 53 at the base of plug contact assembly 24 on its rearward end. Spring 19 urges seal-support 16 outward to the point where the tapered inner diameter of annular seal 10 sealably engages the tapered outer diameters 46 of inner seal elements 13 and 14, which are substantially fixed in axial position. The forward travel of seal 10 is stopped when its tapered inner diameter 45 sealably engages tapered outer diameter 46 formed by the pressed-together seal elements 13, 14. Shoulder 21 formed by the transition between bores 8 and 17 in plug shell 4 provides a secondary, back-up stop to limit the outward travel of seal 10.

Seal-support 16 also provides attachment points for one end of a tubular flexible wall or bladder 23 which defines an oil-filled contact chamber 22, as well as for a sleeve 27, and also acts as a forward seat for spring 19. Tubular portion 39 of seal seat or support 16 acts as a squirm guide for spring 19. Vent holes 40 in tubular portion 39 ensure adequate ventilation through the tubular section's walls. Alignment key 54 cooperates with keyway 55 in plug shell 4 and keyway 155 (see FIG. 6) in the base of plug contact assembly 24 keep plug contact assembly 24 rotationally aligned with shell 4.

Oil chamber or plug contact to chamber 22 is a volume enclosed by flexible wall 23 and seal-support 16 on its outer diameter, by face 53 of plug contact assembly 24 on its rearward end, and by seal elements 13, 14 and outer annular seal 10 on its forward end. Flexible wall 23 is secured between the base of plug contact assembly 24 and end portion 18 of the seal support 16. Flexible wall 23 has a shoulder 28 at its forward end seated in a groove or seat 29 in the outer diameter of seal-support 16. Sleeve 27 serves to keep shoulder 28 engaged in seat 29 of seal-support 16. Sleeve 27 is retained in position by snap fit into seat 30 of seal-support 16. Shoulder 31 on the rearward end of flexible wall 23 engages groove 32 in base 124 of plug contact assembly 24, and is retained in that groove by bore 17 of plug shell 4.

Vent holes 25 in shell 4 allow the outside environment to act against flexible wall 23 so that the pressure within the enclosed volume of oil remains substantially the same as that outside of the oil volume. Nut 6 cooperates with plug shell 4 to rigidly contain the various other plug components.

Figure 6:
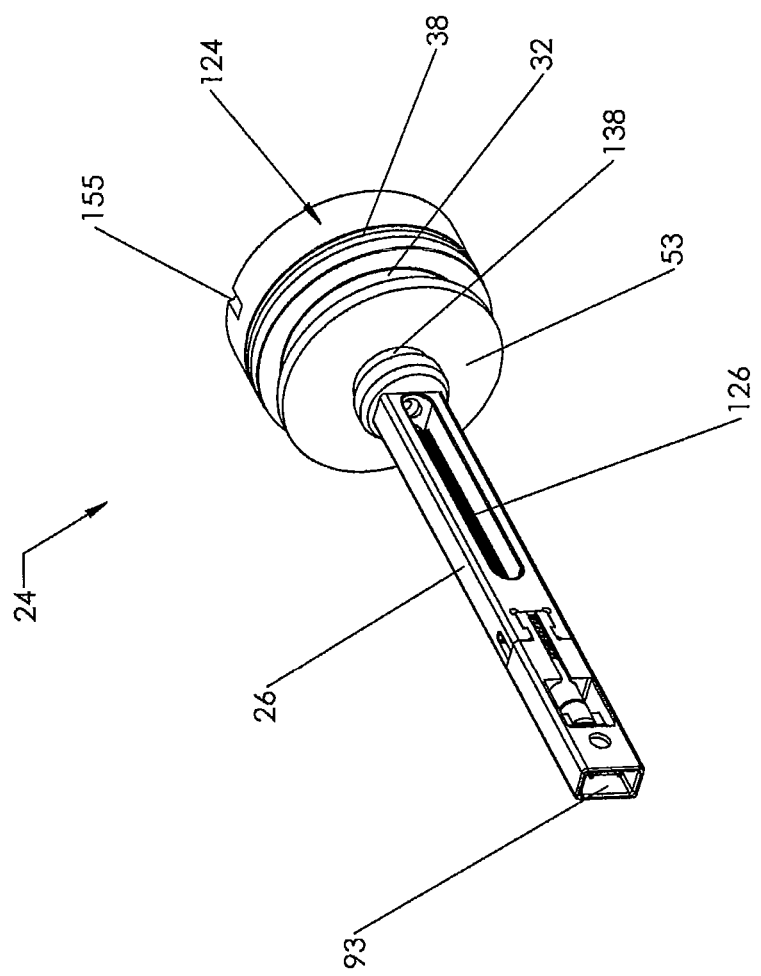
FIG. 6 is a perspective view of the plug contact assembly.

Optical plug contact assembly 24 shown in more detail in FIG. 6 is substantially identical to that described in U.S. patent application Ser. No. 11/279,474 filed on Apr. 12, 2006, and U.S. Pat. No. 7,244,132 issued on Jul. 17, 2007, the contents of both of which are incorporated herein by reference. As illustrated in FIG. 6, contact assembly 24 has a rigid base 124 and a tubular extension 26 of rectangular cross-section extends from base 124 into the oil chamber 22. An optical fiber ribbon 126 is guided inside extension 26 and terminates in an optical ferrule or element 93 recessed inwardly from the open end of extension 26. Base or rear end 124 of the plug contact assembly 24 has spaced mounting grooves 32, 38 and 138 on its outer surface, as best illustrated in FIG. 6.

FIGS. 3 and 4 show the plug inner seal assembly 73 in the unmated and mated conditions, respectively. Seal elements 13, 14 of elastomeric material are bonded or otherwise suitably attached to respective back plates 33, 34, which, in turn, are rigidly formed as a unit with stand-off tine pairs 42 and 35. The tines are forward extensions of tine base 36, which is snap mounted by rearward directed fingers 37 to groove 138 in base 124 of plug contact assembly 24, as illustrated in FIG. 2. The seal elements 13, 14 are therefore at a substantially fixed axial position in bore 17. Rectangular extended portion 26 of plug contact assembly 24 (FIG. 6) extends from base or rear end 124 through a rectangular opening 41 in tine base 36 (FIG. 3), which serves to rotationally orient the split-disc seal assembly to the other components of the plug assembly. Each seal element 13, 14 is generally half-disc shaped, with a tapered outer surface for sealing engagement with the tapered through bore 45 in outer annular seal 10. The outer or forward end faces of the seal elements 13, 14 are of semi-circular shape, as seen in FIGS. 1A, 3 and 4, and elements 13, 14 have opposing, substantially flat inner diametrical faces or seal faces 102, as seen in FIG. 4.

In the unstressed, mated condition of FIG. 4, tine pairs 35 and 42 project directly outward, perpendicular to face 43 of tine base 36, and the seal elements 13, 14 are spaced apart to leave a gap or space 92 between their inner diametrical faces 102. In the unmated condition of FIGS. 2 and 3, elastomeric seal elements 13 and 14 are pressed together radially by tapered bore 45 of annular seal 10, so that diametrical faces 102 are in face-to-face sealing engagement, and tine pairs 35 and 42 are simultaneously bent or displaced toward each other. When thus bent, the tines have a modest residual spring force directed radially outward.

Seal elements 13, 14 are held rigidly forward from face 53 of plug contact assembly 24 by tine pairs 35, 42. Annular end seal assembly 44 (FIG. 5), on the other hand, is forced axially inward by the receptacle during mating, further compressing spring 19.

Figure 5:
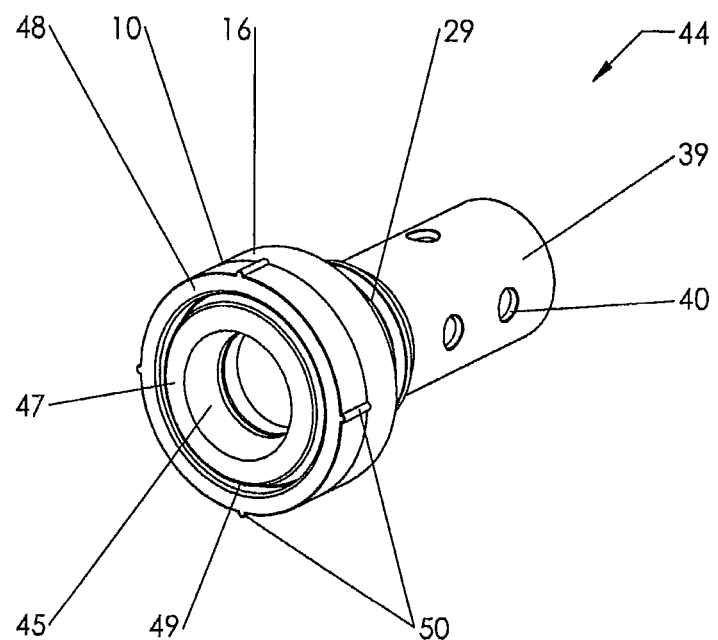
FIG. 5 is a perspective view of the plug annular end seal assembly.

FIG. 5 is a perspective view of the plug annular end seal assembly 44. The assembly consists of outer annular seal 10 and seal-support 16. Seal 10 is bonded or otherwise suitably attached to seal-support 16. Outer annular seal 10 is made from an elastomeric material. It has a tapered inner bore 45 which is tapered outwardly from the inner to the outer or front end of seal 10. Seal elements 13, 14 have a corresponding outwardly tapered outer diameter or surface 46 (see FIG. 3). A raised inner annular surface portion 47 of the end face of seal 10 which surrounds bore 45 protrudes slightly outward axially from a surrounding outer annular surface portion 48 (see FIGS. 2 and 5). Surface portion 47 is the area of the annular outer seal that sealably engages a corresponding end portion 88 (FIG. 11) of the end face of receptacle outer annular seal 9 during mating. Groove 49 separates annular inner and outer end surface portions 47 and 48 of the seal 10 and provides space for the inner seal portion to expand outward radially when pressed axially against its receptacle counterpart 9. Centering ribs 50 on the outer surface of seal 10 keep assembly 44 centered in bore 17 of plug shell 4 as the assembly moves axially within the bore during mating and de-mating.

An axial cross-sectional view of unmated receptacle 1 is shown in FIG. 8, while various individual parts of the receptacle are illustrated in FIGS. 7 and 9 to 11. As illustrated in FIGS. 1B and 8, the shell 3 of receptacle unit 1 has a reduced diameter forward end portion 7 and a larger diameter rear end portion 3 separated by shoulder 97 which has a tapered outer portion and a small inner annular portion 97A. Receptacle 1 has a through bore of stepped diameter having a shoulder 69 between the larger and smaller diameter portions 100, 58 of the bore. An oil chamber 60 is defined in the through bore by cooperating outer annular seal 9 and inner seal elements 11 and 12 on its forward end, by face 55 of a base or end portion 156 of the receptacle contact assembly 56 on its rearward end, and by bore portion 58 and flexible tubular element or bladder 57 of a compensator 59 in bore portion 100 on its outer perimeter. Shoulder 61 of compensator 59 is seated sealably in groove 62 on the outer surface of the end portion 156 of receptacle contact assembly 56 on its rearward end, and shoulder 64 of the compensator likewise seats in groove 63 of a compensator support 65 on its forward end. Bore portion 100 of receptacle shell 3 retains the bladder shoulders 61 and 64 in their respective grooves. Four stand-off rods 66 seat in four respective counter-bores 67 of compensator support 65 at one end and respective counter-bores 68 (FIG. 7) of end portion 156 of contact assembly 56 at the opposite end, maintaining correct axial spacing of the compensator support. Although the illustrated embodiment has four stand-off rods 66 and associated bores, a greater or lesser number of stand-off rods and associated bores may be used in alternative embodiments. Terminal nut 5 and shoulder 69 of receptacle shell 3 retain the compensator assembly, consisting of the compensator, stand-off rods and compensator support, as well as the receptacle contact assembly 56, contained in position. Annular outer seal 9 is bonded or otherwise suitably attached to the surfaces of cavity or recess 87 in the forward end of receptacle shell 3. An inwardly tapered bore portion 85 in bore 58 extends up to recess 87. As best illustrated in FIGS. 11A and 11B, receptacle outer annular seal 9 has an inwardly tapered bore 86 extending from its rear end to forward end face 88, and an inwardly tapered end portion 89 on the outer surface of end seal 9 extends up to end face 88.

Annular end face 88 of receptacle outer annular seal 9 protrudes outward beyond the end of receptacle shell 3 when installed, as illustrated in FIG. 8. End face 88 sealably presses against corresponding end face portion 47 of plug outer annular seal 10 when the connector halves are mated, as described in more detail below. Tapered portion 89 on the outer surface of receptacle outer annular seal 9 provides an annular space 90 into which the elastomeric outer annular seal 9 can expand radially when pressed axially against surface portion 47 of plug outer annular seal 10.

Figure 7:
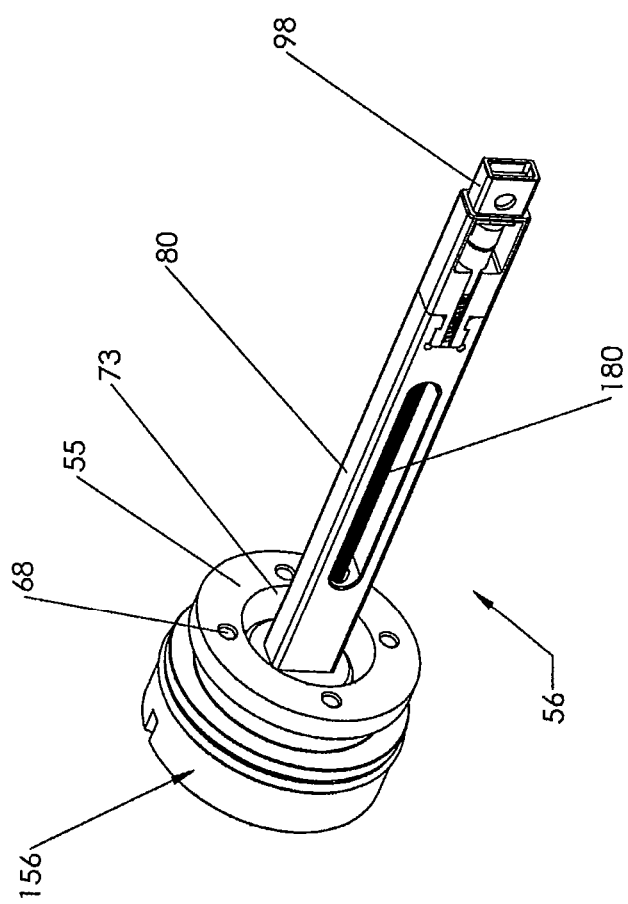
FIG. 7 is a perspective view of the receptacle contact assembly.

Receptacle contact assembly 56 is illustrated in more detail in FIG. 7 and comprises base or end portion 156 which is secured at the rear end of bore portion 100, and a tubular guide portion 80 of rectangular shape which extends from base 156 into the oil-filled chamber 60. The contact assembly 56 is of similar construction to the plug contact assembly 24. Optical ribbon fiber 180 extends through guide portion 80 and terminates in an optical contact ferrule or contact element 94 which is housed in reduced cross-section forward end portion 98 of guide portion 80, as best seen in FIG. 8.

Figure 10:
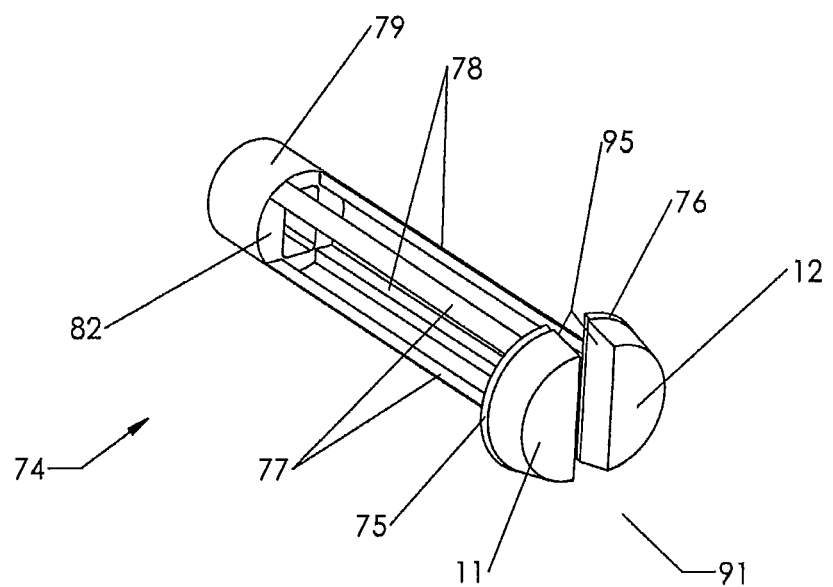
FIG. 10 is a perspective view of the mated receptacle inner seal assembly.
Figures 11A, 11B:
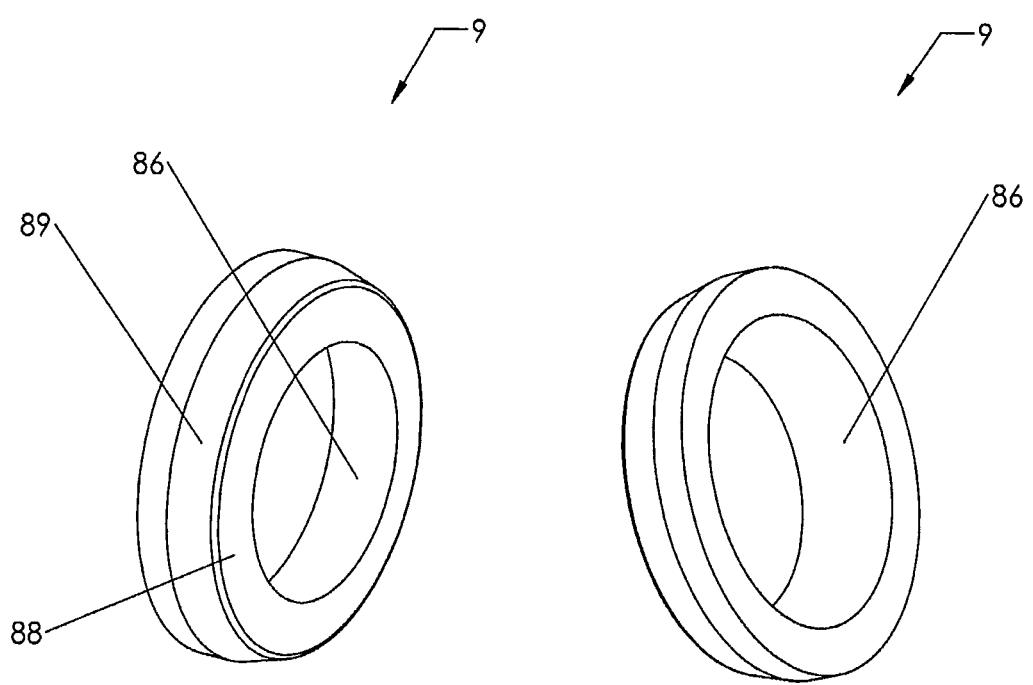
FIG. 11A is a front perspective view of the receptacle outer annular end seal.
FIG. 11B is a rear perspective view of the receptacle outer annular end seal.

Construction of receptacle inner seal assembly 74 (FIGS. 9, 10) is very similar to that of corresponding plug inner seal assembly 73 (FIGS. 3, 4). FIGS. 9 and 10 illustrate the receptacle inner seal assembly 74 in the unmated and mated conditions, respectively. Seal elements 11, 12 of half disc-like shape are bonded or otherwise suitably attached to respective back plates 75, 76, which, in turn, are rigidly formed as a unit with stand-off tine pairs 77 and 78. Seal elements 11, 12 are of similar half disc-like shape to the plug seal elements 13, 14, and have semi-circular outer end faces. However, outer surface 84 in the mated condition of FIG. 9 is tapered inwardly up to the outer end faces of elements 11, 12, rather than outwardly, as is the case with elements 13, 14 of the plug inner end seal assembly. The tines 77, 78 are forward extensions of tine base 79. Rectangular opening 81 in tine base 79 (FIG. 9) engages over the rectangular guide portion 80 of receptacle contact assembly 56 (FIG. 7), which serves to rotationally orient inner seal assembly 74 to the other components of the receptacle assembly. At the same time, tine base 79 is free to travel within fixed limits on rectangular guide portion 80 (FIG. 7) of receptacle contact assembly 56. In the unstressed, mated condition of FIG. 10, tine pairs 77, 78 project directly outward, perpendicular to face 82 of tine base 79, and the seal elements 11, 12 are spaced apart to leave a gap or space 91 between their inner diametrical faces or seal faces 95. In the unmated condition of FIGS. 8 and 9, elastomeric seal elements 11 and 12 are pressed together radially by tapered bore 86 of annular seal 9, so that faces 95 are in face-to-face sealing engagement, and tine pairs 77 and 78 are simultaneously bent toward each other. When thus bent, the tines have a modest residual spring force directed radially outward.

As illustrated in FIG. 8, the rear portion or tine base 79 of the inner seal assembly 74 seats against shoulder 83 at the base of a tubular cavity of spring-seat 72. The forward end of a spring 70 seats against shoulder 71 at the forward end of spring-seat 72, and the rear end seats against the base 156 of contact assembly 56 in groove 73 (FIG. 7). Spring 70 urges the spring seat and inner seal assembly 74 forward. As spring 70 forces the inner seal assembly 74 into tapered bore portion 85 of receptacle shell 3, inner seal elements 11, 12 are forced together radially, bending tine pairs 77 and 78 together, as illustrated in FIG. 9. The inner seal assembly travels forward until the tapered outer surface 84 of the seal elements 11, 12 is in sealing engagement with corresponding tapered inner surface or bore portion 86 of receptacle outer annular seal 9 (FIGS. 8 and 9). Backup plates 76 and 75 cannot pass through the opening at the forward end of tapered bore 85 of the receptacle shell, thus providing a secondary back-up stop for the forward motion of inner seal assembly 74.

As the plug and receptacle units 2, 1 are moved into mating engagement, reduced-diameter portion 7 of the receptacle shell enters bore 8 of the plug shell. Plug shell alignment key 20 finds receptacle shell keyway 15, moving the connector halves into rotational alignment. As mating proceeds, annular end face 88 of receptacle outer annular seal 9 presses against raised annular end surface portion 47 of plug outer annular seal 10, and the end faces of seal elements 11, 12 of receptacle inner seal assembly 74 are pressed against corresponding end faces of the opposing seal elements 13, 14 of plug inner seal assembly 73. Axially directed pressure of the various sealing element faces against each other continues to increase until it is sufficient to overcome the pre-load on plug spring 19, causing plug annular end seal assembly 44 to move inward within the plug shell. Simultaneously, plug inner seal assembly 73 forces receptacle inner seal assembly 74 inward, further compressing spring 70. The arrangement is such that all of the seals are pressed together before there is any movement of the rigid, spring-driven mechanism. The overall effect is that both the plug and receptacle outer annular seals 10, 9 move into the plug shell 4, while simultaneously both pairs of generally half disc-shaped seal elements 11, 12 and 13, 14 move into the receptacle shell. As the annular seals and disc-shaped seal elements move away from each other, a central, tapered, through-bore 99 (FIG. 12) formed by the pressed-together outer annular seals 9 and 10 is completely open, thereby permitting free communication between the plug and receptacle oil volumes, and also permitting the seals 9, 10 to pass over contact element 93 of the plug contact assembly. The forward faces of the pair of seal elements 13, 14 remain pressed against the corresponding faces of the opposing pair of seal elements 11, 12 throughout the mating process, and in the fully mated connector. Although they are pressed together, the opposed faces do not have to seal anything. They simply have to remain pressed together to retain in place any material trapped between them at the beginning of the mating process.

As the pairs of half disc-shaped seal elements 11, 12 and 13, 14 move into the receptacle, they pass through the enlarging tapered section 85 of receptacle shell 3. Tine pairs 35, 42 and 77, 78 of the plug and receptacle, respectively, are located in the respective contact chambers 22 and 60, 58 in the unmated condition, as illustrated in FIGS. 2 and 8. The tine pairs act as biasing mechanisms and spring radially outward into the mated condition of FIGS. 4 and 10, creating aligned gaps or seal openings 92, 91, respectively (FIGS. 4, 10 and 12) between the half disc-shaped seal elements. As illustrated in FIGS. 4 and 10, the opposite flat faces of the seal elements in the spaced apart position form a partially rectangular seal opening. Contact element 94 of receptacle contact assembly 56 is then free to pass through gaps or seal openings 91, 92 as the forward end portion of the receptacle unit continues to move into the plug shell, completing the optical junctions with contact element 93 of plug contact assembly 24. The rectangular cross section of the tubular guide portion or stem 80 and contact element 94 of the receptacle contact assembly is aligned with the partially rectangular seal openings to allow the receptacle contact assembly to pass through the openings as the units are moved into mating engagement, as illustrated in FIG. 12.

Figure 12:
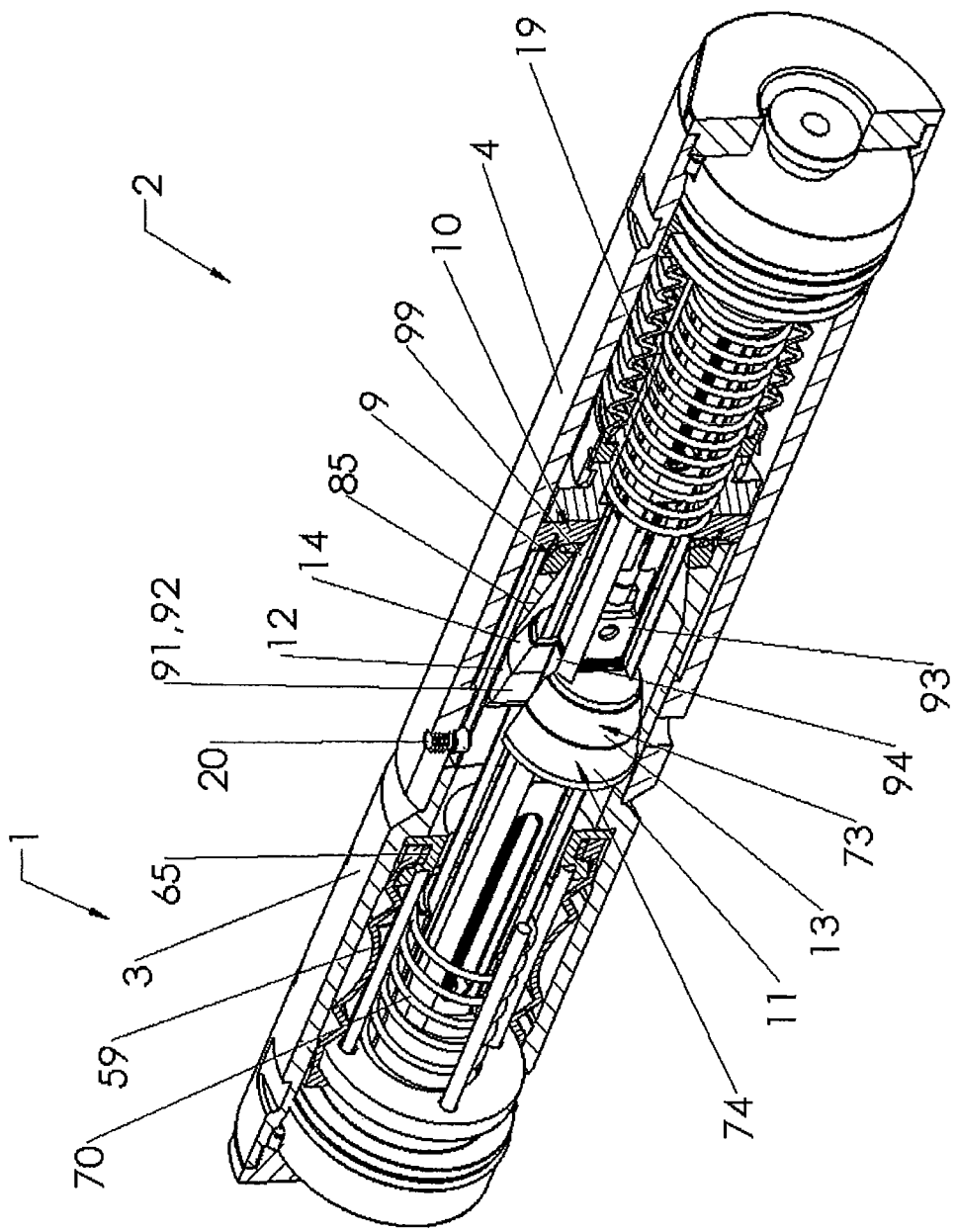
FIG. 12 is a partial axial cross-sectional view of the mated connector.

The mated connector is shown in FIG. 12. Insertion of the receptacle into the plug shell is stopped when annular end portion 96A of plug shell 4 bottoms out against inner annular portion 97A of the shoulder 97 of receptacle shell 3, leaving a small gap between hard stops of the contact junctions.

The connector de-mating sequence is the reverse of the mating sequence. When de-mating, the one or more plug contacts disconnect from the respective one or more receptacle contacts, moving contact element or ferrule 94 axially away from contact element 93, and withdrawing contact element 94 back through the spaces 91, 92 between the inner end faces of seal elements 11, 12 and 13,14, respectively. As the receptacle unit is retracted out of the plug shell, the inner, disc-shaped seal elements 11, 12 of the receptacle are urged axially outwardly by spring 70 and move into the bore portion 86 in the respective outer annular seal member 9 as the smaller diameter end 7 of the receptacle starts to retract out of the forward end portion 8 of the plug bore. At the same time, the outer annular seal member 10 of the plug is urged by spring 19 back over the inner seal elements 13, 14. Each pair of half disc-shaped seal elements is urged together radially to close the gaps 91 and 92 and form full-circular discs which fill the central openings of their respective annular outer seals before the plug and receptacle halves are disconnected. That action effectively seals the individual plug and receptacle end faces, while the plug-receptacle interface between connector halves still remains sealed from the outside environment by the still pressed-together annular outer seals. Next, the plug and receptacle separate, removing the spring forces that pressed the annular outer seals together, and the two individually-sealed connector halves are disconnected.

The opening between plug and receptacle oil volumes in the above connector is created in a unique way when the connector halves are mated. The half-circular disc-shaped inner seal elements allow free communication between oil volumes as soon as they are axially displaced from their respective annular outer seals. The construction requires less relative axial motion of the plug and receptacle contacts than some prior art constructions to create an opening between the connector halves for the mating contacts to pass. This is because the half disc-shaped seals spring radially outward very quickly as the receptacle enters the plug.

The connector described above has improved internal ventilation due to the larger opening between the oil volumes as compared to some prior art arrangements, allowing free and immediate oil communication between the chambers. As soon as the disc-shaped seals move axially, oil is free to move past them from one chamber to the other. They remain pressed together axially, and begin to separate radially, too; but they are no longer sealably seated in the annular outer seals, so oil can flow around them. The mate/demate forces are reduced since the design avoids the need to overcome high stress O-ring seals or tightly squeezing sphincter-type seals, all of which require higher spring forces than the above construction. The mating stroke is shorter, since the split disc-type end seals move out of the way earlier in the mating sequence and move transversely apart to provide the opening between the oil chambers through which the mating contacts are free to pass. This allows a reduction of the axial space between the contacts and thus a shorter mating stroke. Due to the shorter mating stroke, the overall mated length of the connector is also reduced, as is the unmated length of each connector part. The mechanical action is relatively simple and reliable, and produces relatively low stress on the elastomeric parts, as compared to some prior art connectors which require a great deal of stretch on the elastomers forming the seals, limiting the choice of elastomers. This construction allows choice of the seal material from a large range of elastomers with enhanced chemical resistance. At the same time, the connector uses the same optical interfaces and fiber feed-through capillaries as existing connectors. Overall, the components of this connector are relatively simple and fewer components are required than at least some prior art connectors.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A connector, comprising:
    a first connector unit having a first contact chamber and a first contact assembly within the first contact chamber;
    a second connector unit having a second contact chamber and a second contact assembly within the second contact chamber;
    each contact chamber having a forward end opening;
    each connector unit having a central longitudinal axis;
    the connector units being movable between an unmated condition and a mated condition in which they are in releasable mating engagement and the first and second contact assemblies are in communication;
    at least one elastomeric face seal assembly which seals the forward end opening of one of the contact chambers in the unmated condition of the connector units, the face seal assembly comprising a first outer annular seal having a through bore and a first inner seal separate from the outer seal and having a first pair of inner seal elements having outer surfaces and opposing seal faces;
    at least one of said seal elements being movable relative to the other seal element in a direction transverse to the central longitudinal axis of the connector unit between a sealed condition in which the opposing seal faces are in sealing engagement when the connector units are unmated and an open condition in which the inner seal elements are spaced apart to define a passageway through the inner seal when the connector units are mated;
    the outer surfaces of the inner seal elements being in sealing engagement with the through bore of the outer annular seal in the sealed condition.

2. The connector of claim 1, wherein said one face seal assembly comprises a first face seal assembly which seals the forward end opening of the first contact chamber in the unmated condition of the first connector unit, and a second face seal assembly seals the forward end opening of the second contact chamber in the unmated condition of the second connector unit, the second face seal assembly comprising a second outer annular seal having a through bore, and a second inner seal separate from the second outer annular seal and comprising a second pair of inner seal elements which seal the through bore in the second annular seal in the sealed condition of the second face seal assembly.

3. The connector of claim 2, wherein the outer annular seal of each face seal assembly has a forward end face which is in face-to-face sealing engagement with the opposing forward end face of the outer annular seal of the other face seal assembly in the mated condition of the connector units.

4. The connector of claim 3, wherein the first outer annular seal is movably mounted in the first connector unit for movement between an extended position when the units are unmated and a refracted position in which it is moved inward when the units are mated, and the second outer annular seal is secured in a substantially fixed axial position in the second connector unit, whereby the second outer annular seal engages the first outer annular seal and urges the first outer annular seal towards the retracted position as the units are moved into mating engagement.

5. The connector of claim 4, further comprising a first biasing device urging the first outer annular seal into the extended position when the first connector unit is in the unmated condition, the biasing device urging the forward end faces of the outer annular seals into sealing engagement as the connector units are moved into mating engagement.

6. The connector of claim 4, wherein the second inner seal is movably mounted in the second connector unit for movement between an extended position when the connector units are unmated and a retracted position in which it is retracted into the second contact chamber when the connector units are mated, and the first inner seal is in a substantially fixed axial position in the first connector unit, whereby the first pair of inner seal elements urge the second pair of inner seal elements inwardly into the second contact chamber as the connector units are mated.

7. The connector of claim 6, further comprising a second biasing device urging the second inner seal into the extended position when the second connector unit is in the unmated condition.

8. The connector of claim 1, wherein the face seal assembly further comprises a radially directed biasing device which urges the inner seal elements radially apart in the open position.

9. The connector of claim 1, wherein the inner seal elements comprise a pair of elastomeric disc halves of substantially half-circular shape each having a substantially flat diametrical seal face which is in face-to-face sealing engagement with the opposing flat diametrical seal face of the other disc half when the connector unit is in the unmated condition.

10. The connector of claim 1, wherein the first inner seal further comprises a base which is axially spaced from the pair of inner seal elements and at least one connecting tine extending between the base and each inner seal element.

11. The connector of claim 10, wherein the connecting tines are flexible to allow the inner seal elements to move radially between the sealed condition and the open condition.

12. The connector of claim 11, wherein the connecting tines comprise a biasing device which urges the seal elements radially outward and away from one another into the open condition in which the seal faces are spaced apart.

13. The connector of claim 10, wherein at least two connecting tines connect the base to each inner seal element.

14. The connector of claim 10, wherein each inner seal element comprises a rigid back plate and an elastomeric seal portion secured to the back plate.

15. The connector of claim 14, wherein the base is of rigid material and the connecting tines extend between the base and the respective back plates.

16. The connector of claim 13, wherein the inner seal elements and connecting tines are movable radially outwardly between the sealed condition in which the seal face of each inner seal element is in face-to-face sealing engagement with the opposing seal face of the other inner seal element and the connecting tines are inclined radially inwardly between the base and seal elements, and the open condition in which each inner seal element is radially spaced from the opposing inner seal element to define said passageway and the tines are displaced outwardly at their forward ends.

17. The connector of claim 16, wherein the connecting tines are at least partially resilient and are deformed to produce a radially outwardly directed spring force when the inner seal elements are engaged in the outer annular seal.

18. The connector of claim 2, wherein the contact chambers are filled with fluid and the inner seal elements of the first and second face seal assemblies are located in the second contact chamber of the second connector unit in the axially displaced, open condition when the connector units are in mating engagement.

19. The connector of claim 18, further comprising a fluid passageway provided between the contact chambers around the inner seal elements as the inner seal elements are displaced axially relative to the respective outer annular seals and move into the second contact chamber, the fluid passageway being formed between an inner wall portion of the second contact chamber and the opposing outer surfaces of the inner seal elements.

20. The connector of claim 1, wherein the through bore of the outer annular seal is tapered along at least part of its length and the opposing outer surfaces of the inner seal elements are correspondingly tapered for sealing engagement in the through bore in the unmated condition of the connector unit.

21. The connector of claim 2, wherein the through bore of the first outer annular seal is tapered outwardly up to the forward end face and the through bore of the second outer annular seal is tapered inwardly up to the forward end face, and the outer surfaces of the first and second inner seals are correspondingly tapered for sealing engagement in the through bores of the first and second outer annular seals, respectively.

22. The connector of claim 2, wherein the forward end face of one of the outer annular seals has a first, inner ring portion and a second, outer ring portion, the inner ring portion being raised relative to the outer ring portion and being in sealing engagement with the opposing forward end face of the other outer annular seal in the mated condition of the connector units.

23. The connector of claim 22, wherein the forward end face of said one outer annular seal further comprises an annular groove separating the inner and outer ring portions of the end face.

24. A face seal assembly for sealing a forward end opening of a contact chamber in a connector unit when the connector unit is unmated, comprising:
  an outer annular seal which fits in a forward end opening of a connector contact chamber at least in an unmated condition of the connector unit, the outer annular seal having a through bore defining a longitudinal central axis of the face seal assembly;
  an inner seal which seals the through bore in a sealed position of the outer and inner seals;
  the inner seal having a pair of separate inner seal elements which fill the cross-sectional area of the through bore in the outer annular seal along at least part of the length of the through bore in the sealed position, the inner seal elements together defining a continuous outer surface which is in sealing engagement with the through bore of the outer annular seal in the sealed position; and
  the inner seal elements being formed at least partially of elastomeric material and each having an inner seal face which is urged in a direction transverse to the longitudinal central axis of the face seal assembly into face-to-face sealing engagement with the inner seal face of the other seal element in the sealed position.

25. The seal assembly of claim 24, wherein the inner seal further comprises a base which is axially spaced from the inner seal elements and at least one connecting tine extending between the base and each inner seal element.

26. The seal assembly of claim 24, wherein the inner seal is displaced out of the through bore in the outer annular seal in the open position and the connecting tines comprise a biasing mechanism which urges the inner seal elements apart to define a passageway between the seal elements when the inner seal is displaced out of the through bore.

27. The seal assembly of claim 24, wherein the through bore in the outer annular seal is tapered and the outer surface of the inner seal elements has a matching taper for sealing engagement in the tapered through bore in the sealed position.

28. The connector of claim 1, further comprising a first biasing mechanism which urges the first pair of inner seal elements into sealing engagement as the connector units are moved from the mated to the unmated condition.

29. The connector of claim 28, further comprising a second biasing mechanism which urges the first pair of inner seal elements apart as the connector units are moved from the unmated condition into the mated condition.

30. The connector of claim 29, wherein at least one of the first and second biasing mechanisms is located in the first contact chamber.

31. The connector of claim 1, wherein the seal faces of the inner seal elements are at least substantially flat and define an at least partially rectangular seal opening through the face seal assembly in the open condition.

32. The connector of claim 31, wherein at least one of the contact assemblies comprises a base and a tubular stem extending from the base into the contact chamber and carrying a plurality of contacts, and the tubular stem is of rectangular cross section and configured for passing through the at least partially rectangular seal opening in the face seal assembly for engagement with the other contact assembly in the mated condition of the connector units.

33. The connector of claim 2, wherein the face seal assemblies have front end faces which include raised portions, the opposing raised portions of the front end faces being in sealing engagement in the mated condition of the connector units.

34. The connector of claim 2, further comprising a biasing spring which urges opposing front faces of the face seal assemblies into sealing engagement in the mated condition of the connector units, the biasing spring being located within one of the contact chambers in the unmated condition of the connector units.

* * * * *